UNITED STATES PATENT OFFICE.

BRUNO RICHARD SEIFERT, OF RADEBEUL, GERMANY, ASSIGNOR TO DR. F. VON HEYDEN, NACHFOLGER, OF SAME PLACE.

PHENOL-BISMUTH COMPOUND.

SPECIFICATION forming part of Letters Patent No. 516,358, dated March 13, 1894.

Application filed March 1, 1893. Serial No. 464,251. (Specimens.)

*To all whom it may concern:*

Be it known that I, BRUNO RICHARD SEIFERT, of Radebeul, near Dresden, in the Kingdom of Saxony, German Empire, have invented certain new and useful Improvements in Antiseptic Compounds and Processes of Manufacturing the Same, of which the following is a specification.

My invention relates to the manufacture of antiseptic compounds from carbolic acid (phenol) and all other phenols. Phenols are known to possess highly poisonous properties, small quantities administered internally being sufficient to cause death. Besides these highly poisonous properties phenols have other noxious properties, viz: they are not neutral, but show a highly corrosive action and destroy the skin; furthermore they have a highly acrid taste and mostly an offensive smell. According to my invention the phenols are freed from their poisonous and other noxious properties mentioned above.

My invention consists in the conversion of the phenols into phenol-bismuth-compounds, which are not described by chemical literature either in regard to their properties or in regard to their manufacture. These new phenol-bismuth compounds are not merely simple mechanical mixtures of the ingredients of which they are composed but are new chemical substances in which no free phenol exists, the phenol being chemically combined with bismuth. In comparison with the free phenols these new phenol-bismuth-compounds are nearly non-poisonous. Greater quantities may be administered internally without any damage or injurious effect. Such new compounds are powders insoluble in water and alcohol and differing also advantageously from the phenols in the fact of being neutral and free from the offensive smell, the acrid taste and the corrosive action common to the phenols. The manufacture of these phenol-bismuth-compounds is effected by the alternate action of bismuth-salts (preferably bismuth nitrate) with the watery or alcoholic solutions of the phenols or phenol alkalies or earthy alkalies. I for instance proceed as follows:

(First.) A solution of thirty-eight parts by weight of phenol in four hundred parts by weight of water and sixteen parts by weight of sodium hydrate are mixed by energetic stirring or agitation with forty-nine parts by weight of bismuth nitrate within a tank. The bismuth phenolate being precipitated is filtered, washed with water and dried. It forms a grayish white powder containing about eighty per cent. of oxide of bismuth $(Bi_2O_3)$. In the reaction a part of the phenol is set free out of the alkaline salt. In the first example this part of the phenol which is set free goes into the mother-lye. If, however, a phenol which is difficultly soluble in water is employed as for instance tribromophenol, the same must be separated from the raw product of reaction by means of alcohol or other suitable solvent, for instance.

(Second.) Thirty kilograms of tribromophenol are dissolved with four kilograms hydrate of sodium (hydroxyd of sodium) and one hundred and fifty liters of water and afterward mixed with twelve kilograms of nitrate of bismuth. The product of reaction is afterward filtered, washed and extracted by alcohol. The alcohol takes up free tribromophenol which is regained. The extracted yellow tribromophenol-bismuth contains about fifty per cent. oxyd of bismuth. The beta-naphtol-bismuth obtained in the same manner by employing 14.5 kilograms of beta-naphtol, four kilograms HNaO and twelve kilograms nitrate of bismuth, contains about eighty per cent. oxyd of bismuth.

(Third.) A nitrate solution of ninety-seven kilograms nitrate of bismuth is mixed with an aqueous solution of forty-three kilograms pyrogallol. The yellow precipitate is filtered and washed out. The pyrogallol-bismuth thus obtained contains about forty-eight per cent. of oxid of bismuth, corresponding to the formula

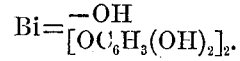

If in this reaction the free acid is neutralized by means of acetates or by means of carbonate of alkalies or caustic alkalies, then basic salts of fifty-five to sixty-five per cent. oxid of bismuth or more are produced. The salts of pyrogallol-bismuth are characterized by their being soluble in alkalies.

The phenols above mentioned may be replaced by the following phenols: ortho-cresol, meta-cresol, para-cresol, ortho-xylenol, metaxylenol, para-xylenol, ortho-chlorophenol, meta-chlorophenol, para-chlorophenol, ortho-bromophenol, meta-bromophenol, para-bromophenol, trichlorophenol, tribromophenol, triiodophenol, ortho-nitrophenol, meta-nitrophenol, para-nitrophenol, ortho-amidophenol, meta-amidophenol, para-amidophenol, trinitrophenol (picric acid), alpha-naphtol, beta-naphtol, thymol, carvacrol, pyrocatechin, hydrochinon, guaicol, creosote, eugenol, pyrogallol, oxychinolin, para-oxychinolin. All these poisonous phenols are by this invention converted into phenol-bismuth-compounds being nearly non-poisonous and free from the offensive smell, acrid taste and corrosive action of the phenols. They are inert against the skin, show a neutral reaction and are insoluble in water, alcohol and ether. They are decomposed into chloride of bismuth and the corresponding phenols by means of hydrochloric acid and into oxide of bismuth and the sodium salts of the corresponding phenols by means of sodium hydrate.

I do not limit myself to the proportions of weight and conditions of production given in the examples mentioned above. For instance, the reaction may be effected within a solution of alcohol or ether. More or less phenol alkalies or nitrate of bismuth may be employed, the result of such variations being phenol-bismuth-compounds having a greater or smaller percentage of bismuth. All such phenol-bismuth-compounds produced have the properties mentioned and the same advantages as compared with the free phenols. The said compounds are mostly obtained in the form of an amorphous powder but in operating slowly during the production they may be obtained in the form of a crystalline powder which, however, while drying and after being pulverized assumes an amorphous appearance.

What I claim as my invention, and desire to secure by Letters Patent, is—

1. The process of manufacturing nearly non-poisonous antiseptic compounds from the poisonous phenols which consists in converting the said phenols into their bismuth-compounds by treating the said phenols in an acid, neutral or alkaline solution with bismuth salts and by filtering and washing the products of reaction thus obtained.

2. The new phenol bismuth compound herein described derived from phenols and bismuth consisting of a powder which is nearly non-poisonous, neutral and insoluble in water, alcohol and ether and inert against the skin.

In testimony that I claim the foregoing as my invention I have signed my name in presence of two subscribing witnesses.

BRUNO RICHARD SEIFERT.

Witnesses:
   GEORG RICHTER,
   WILHELM WIESENHÜTTER.